United States Patent [19]
Zhang et al.

[11] Patent Number: 5,857,085
[45] Date of Patent: Jan. 5, 1999

[54] INTERFACE DEVICE FOR XT/AT SYSTEM DEVICES ON HIGH SPEED LOCAL BUS

[75] Inventors: Lei L. Zhang, Newark; Kwai Chuen So, San Jose, both of Calif.

[73] Assignee: Cypress Semiconductor Corporation, San Jose, Calif.

[21] Appl. No.: 746,645

[22] Filed: Nov. 13, 1996

[51] Int. Cl.$^6$ .................................................. G06F 13/00
[52] U.S. Cl. ........................ 395/309; 395/306; 395/308
[58] Field of Search .................................... 395/306, 308, 395/823, 828, 733, 734, 309, 842

[56] References Cited

U.S. PATENT DOCUMENTS

| | | |
|---|---|---|
| 4,695,839 | 9/1987 | Barbu et al. . |
| 4,791,358 | 12/1988 | Sauerwald et al. . |
| 4,815,026 | 3/1989 | Barbu et al. . |
| 5,054,022 | 10/1991 | Van Steenbrugge . |
| 5,144,662 | 9/1992 | Welmer . |
| 5,163,048 | 11/1992 | Heutink . |
| 5,175,846 | 12/1992 | Bendahan . |
| 5,422,884 | 6/1995 | Goertz . |
| 5,448,554 | 9/1995 | Van Steenbrugge . |
| 5,463,619 | 10/1995 | Van Steenbrugge et al. . |
| 5,535,341 | 7/1996 | Shah et al. ................................ 395/306 |
| 5,692,211 | 11/1997 | Gulick et al. ....................... 395/800.31 |

OTHER PUBLICATIONS

Microcomputer Busses, R.M. Cram, University of California, San Diego, La Jolla, CA and Thermo Electron Thechonologies, San Diego, CA Copyright 1991 by Academic Press, Inc.

IEEE Standard for a Chip and Module Interconnect Bus: SBus, Published by the Institute of Electrical and Electronics Engineers, Inc., 345 East 47th Street, New York, NY 10017, USA, Sep. 17, 1993 Copyright 1993 by the Institute of Electrical and Electronics Engineers, Inc.

SPARC MBus Interface Specification, Revision 1.2, Apr. 10, 1991, Copyright 1991 SPARC International, Inc.

Intel—System Management Bus Specification, Revision 1.0 Feb. 15, 1995, copyright 1994, 1995 Intel Corporation, All Rights Reserved.

Intel—System Management Bus BIOS Interface Specification, Revision 1.0 Feb. 15, 1995, Copyright 1994, 1995, Intel Corporation, All Rights Reserved.

*Primary Examiner*—Meng-Ai T. An
*Assistant Examiner*—Rupal D. Dharia
*Attorney, Agent, or Firm*—Oblon, Spivak, McClelland, Maier & Neustadt, P.C.

[57] ABSTRACT

A host bus interface device is provided for interfacing a processor coupled to a host bus to XT/AT legacy I/O devices and a high speed bus. The legacy I/O devices include an interrupt controller, timer/counter and a real time clock. The host bus interface includes a host controller coupled between the host bus and the high speed bus, with the interrupt controller, the timer/counter and the real time clock coupled to the host controller. The host controller is configured to provide an interface between the processor coupled to the host bus and the interrupt controller, the timer/counter, the real time clock device and the high speed bus. The novel host bus interface device has the advantage of improving system performance of an XT/AT compatible personal computer by reducing access latency of the processor to the XT/AT legacy I/O devices.

12 Claims, 8 Drawing Sheets

INTERFACE DEVICE FOR XT/AT SYSTEM DEVICES ON HIGH SPEED LOCAL BUS

BACKGROUND OF THE INVENTION

1. Field of the Invention

This invention relates to a novel host bus interface, and more particularly to a host bus interface which allows compatibility with older ISA bus standard I/O devices.

2. Discussion of Background

In recent years, high performance personal computers (PCs) have been introduced into the market. These newer high performance PCs are typically much faster than older (also referred to as "legacy") computers such as IBM XT/AT PCs. The newer high performance PCs may be based on CPU's, such as the 80486, Pentium, etc., which can typically operate at speeds much greater than the CPUs of the XT/AT legacy computers, such as the 8186, 8088, 80286, etc. In addition, the newer high performance PCs typically include a high speed peripheral bus, such as a PCI bus, VESA bus, etc., which can typically operate at speeds much greater than the peripheral bus of the XT/AT legacy computers, such as an ISA bus, EISA bus, etc. There are many existing hardware peripherals and software developed for the ISA bus of the XT/AT legacy PCs, and accordingly, it is desirable for these newer high performance PCs to provide compatibility with peripherals and software designed for the older XT/AT PCs having an ISA bus.

Figure 7:
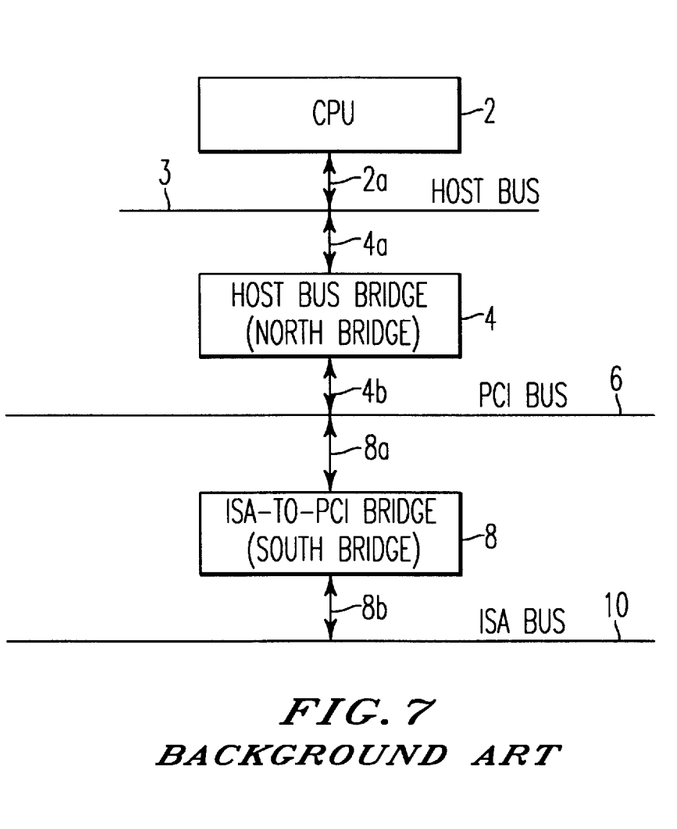
FIG. 7 is a block diagram of a background art host bus interface including a north bridge and a south bridge.

For a newer high performance PC (e.g., based on the 80486 or Pentium CPU, etc.), the above-stated problem may be solved using the configuration shown in FIG. 7. FIG. 7 shows the minimal circuitry required to understand the host bus interface according to the background art invention, although it is to be understood that the PC may include other system devices (which are not shown), such as memories, disk drives, clock generators, monitors, speakers, motherboard, other peripherals, etc., as will be apparent to those skilled in the computer arts.

In FIG. 7, a CPU 2 (e.g., based on the 80486 or Pentium CPU, etc.) is coupled to a host bus 3 via signal lines 2a. A host bus bridge (north bridge) 4 is coupled to the host bus 3 via signal lines 4a. The north bridge 4 provides an interface to PCI bus 6 via signal lines 4b. Also coupled to the PCI bus 6 via signal lines 8a is an ISA-to-PCI bridge (south bridge) 8. The south bridge 8 is also coupled to an ISA bus 10 via signal lines 8b. With the above architecture, CPU 2 is able to perform I/O transactions between the CPU 2 and legacy I/O devices located within the south bridge 8. These legacy I/O devices located in south bridge 8 may provide various functions to peripheral devices connected to the ISA bus 10 and to other system devices of an XT/AT ISA bus PC.

The PCI bus 6 is a newer high speed peripheral bus, such as a 32-bit or 64-bit bus running at 25 MHz or 33 MHz, etc. The ISA bus 10 is an older slower peripheral bus, such as an 8-bit or 16-bit bus running at 8 MHz or 8.33 MHz, etc. The north bridge 4 is a controller chip that typically bridges the CPU 2 and other system resources of the PC (which are not shown), such as DRAM, cache memory, post write buffer, etc. The south bridge 8 is a controller chip that bridges the legacy ISA bus 10 to the faster PCI bus 6 and the north bridge 4. As previously discussed, the south bridge 8 also hosts legacy I/O devices which provide various functions to peripheral devices connected to the ISA bus 10 and which will now be described with reference to FIG. 8.

Figure 8:
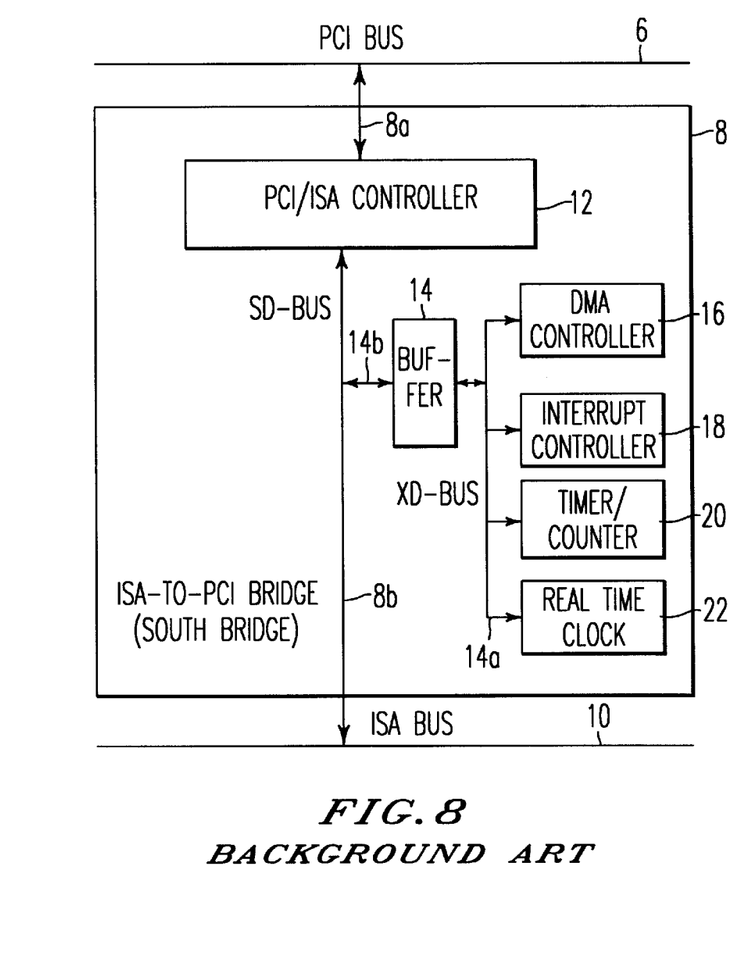
FIG. 8 is a block diagram of a background art south bridge.

FIG. 8 shows details of an internal structure of south bridge 8. In FIG. 8, south bridge 8 includes legacy PCI/ISA controller 12 coupled to signal lines 8a which provide an interface to the PCI bus 6. The PCI/ISA controller 12 is also coupled to signal lines 8b (SD-BUS) which provide an interface to the ISA bus 10. Buffer 14 is coupled to SD-BUS 8b via signal lines 14b. Direct Memory Access (DMA) controller 16, such as an Intel 82C37A CHMOS Programmable DMA controller, interrupt controller 18, such as an Intel 82C59A CHMOS Programmable Interrupt Controller, timer/counter 20, such as an Intel 82C54 CHMOS Programmable Interval Timer, and real time clock 22, such as a Dallas Semiconductor DS 1287 Real Time Clock, are coupled to buffer 14 via signal lines 14a (XD-BUS). The operation of south bridge 8 will now be described.

The PCI/ISA controller 12 provides an interface from the PCI bus 6 to the DMA controller 16, the interrupt controller 18, the timer/counter 20, and the real time clock 22 via buffer 14. The DMA controller 16 provides peripheral devices connected to the ISA bus 10 direct access to the main memory of the PC, thereby freeing the CPU 2 from performing simple but time-consuming data transfers. The interrupt controller 18 manages and prioritizes hardware interrupt requests from peripheral devices connected to the ISA bus 10 and passes the prioritized hardware interrupts to the CPU 2. There are two basic types of hardware interrupts processed by the interrupt controller 18: non-maskable interrupts (NMI) and maskable interrupt requests (IRQ). The timer/counter 20 is a programmable interval timer (PIT) having three independent programmable counters (0, 1 and 2, not shown). The counter 0, for example, is used for periodically updating the PC's internal system clock, the counter 1, for example, is used for periodically activating the PC's memory refresh function, and the counter 2, for example, is used for generating tone frequencies for the PC's speaker. The real time clock 22 is a battery-backed-up timer that keeps a current date and time for the PC regardless of whether the PC is turned on or off. The XD-BUS 14a is a low speed bus defined in the XT/AT PC architecture, and is used by several legacy I/O devices including the DMA controller 16, the interrupt controller 18, the timer/counter 20 and the real time clock 22. These legacy I/O devices, for example, are important for the compatibility of the newer PC designs with software and peripheral hardware designed for the legacy XT/AT ISA bus PCs.

With the above architecture, the CPU 2 accesses the XD-BUS 14a legacy I/O devices by starting I/O transactions on the host bus 3 via the signal lines 2a (FIG. 7). Typically, the CPU 2 is running at 60 or 66 MHz (i.e., 60 or 99 ns clock cycles) and therefore, ideally, the I/O transactions should be completed in as few CPU 2 clock cycles as possible. However, the I/O transactions have to pass through the north bridge 4 and then the south bridge 8 before access to the legacy I/O devices within south bridge 8 can be completed (FIG. 7). At the south bridge 8, the I/O transactions are running at a standard ISA bus timing of, for example, 8 MHz or 8.33 MHz. As a result, a standard 16-bit ISA I/O transaction typically requires a minimum of 375 ns to complete (3 ISA clock cycles at 8 MHz). However, I/O transactions directed towards the interrupt controller 18, the timer/counter 20 and the real time clock 22 are usually 8-bit ISA I/O transactions which require additional ISA clock cycles to complete as compared to the 16-bit ISA I/O transactions. In addition, time is needed for the south bridge 8 to arbitrate for the PCI bus 6 and the ISA bus 10. Therefore in more typical cases the I/O transactions directed towards these legacy I/O devices require in the range of 1.5 microseconds to complete, as seen from the CPU 2 side. When access to these legacy I/O devices is frequent, the CPU 2 is slowed down, which thereby adversely impacts the overall system performance.

The background art configuration of FIG. 7 therefore has several disadvantages including requiring to perform I/O transactions to access legacy I/O devices (e.g., the DMA controller 16, the interrupt controller 18, the timer/counter 20 and the real time clock 22) located in the south bridge 8 at the ISA bus timing of 8 MHz or 8.33 MHz, which thereby adversely impacts the overall system performance when accesses to these legacy I/O devices by the CPU 2 are frequent.

SUMMARY OF THE INVENTION

Accordingly, one object of this invention is to provide a novel host bus interface which improves the performance of newer high performance PCs while still maintaining compatibility with legacy XT/AT ISA bus PCs.

Another object of the present invention is to provide a novel host bus interface which relocates legacy I/O devices from a south bridge to a north bridge, to thereby improve system performance of newer high performance PCs.

The present invention has been made in view of the fact that the time typically required to complete I/O transactions directed towards the XT/AT legacy I/O devices should be reduced in order to increase the system performance of modern PCs supporting XT/AT ISA bus hardware peripherals and software. In addition, XT/AT ISA bus compatibility is desirable for new PC designs since there are many existing hardware peripherals and software developed for the legacy XT/AT ISA bus PCs.

The above and other objects are achieved according to the present invention by providing a new and improved host bus interface device for interfacing a processor coupled to a host bus to XT/AT legacy I/O devices and a high speed bus. The legacy I/O devices typically include an interrupt controller, timer/counter and a real time clock. The host bus interface includes a host controller coupled between the host bus and the high speed bus, with the interrupt controller, the timer/counter and the real time clock coupled to the host controller. The host controller is configured to provide an interface between the processor coupled to the host bus and the interrupt controller, the timer/counter, the real time clock device and the high speed bus.

The novel host bus interface device of the present invention has the advantage of improving system performance of an XT/AT compatible personal computer by reducing access latency of the processor to the XT/AT legacy I/O devices.

BRIEF DESCRIPTION OF THE DRAWINGS

A more complete appreciation of the present invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 1:
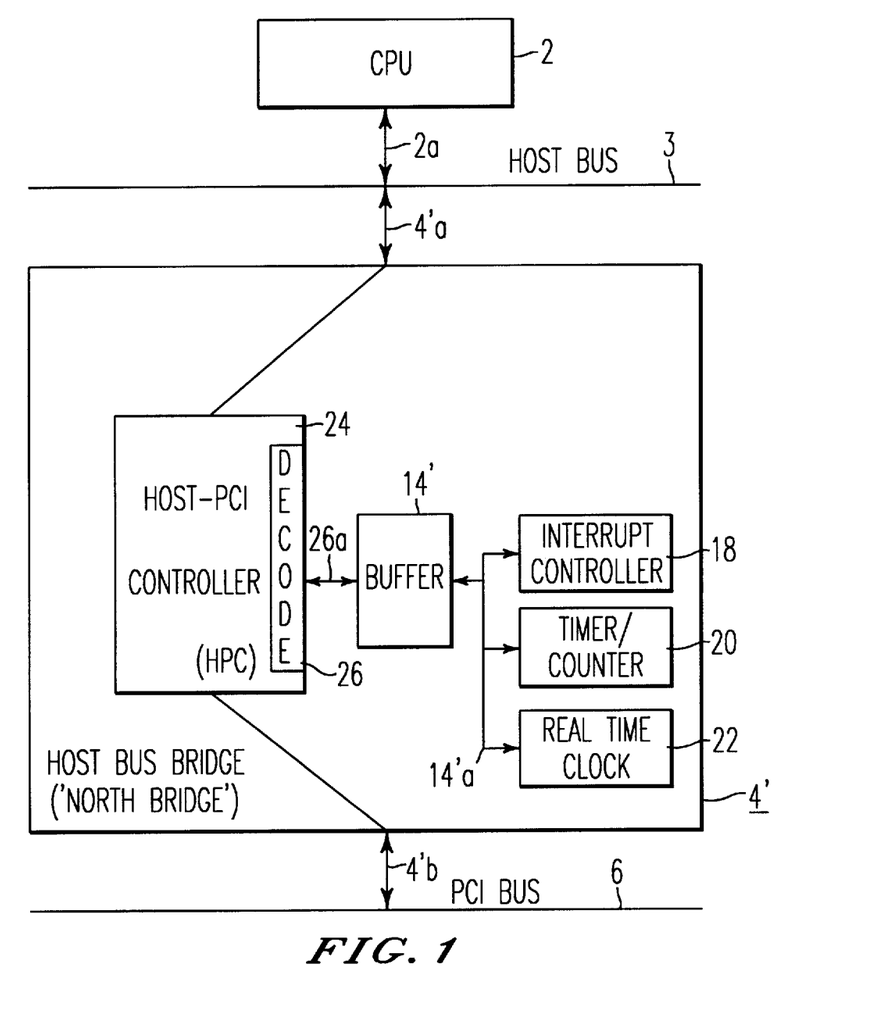
FIG. 1 is a block diagram of a host bus interface according to the present invention.

Referring now to the drawings, wherein like reference numerals designate identical or corresponding parts throughout the several views, and more particularly to FIG. 1 thereof, a north bridge 4' according to the present invention is illustrated.

As discussed above, the background art device of FIGS. 7 and 8 requires a CPU 2 to access legacy I/O devices in the through south bridge 8 through the north bridge 4 at the ISA bus 10 timing. This requires time consuming operations.

Figure 5:
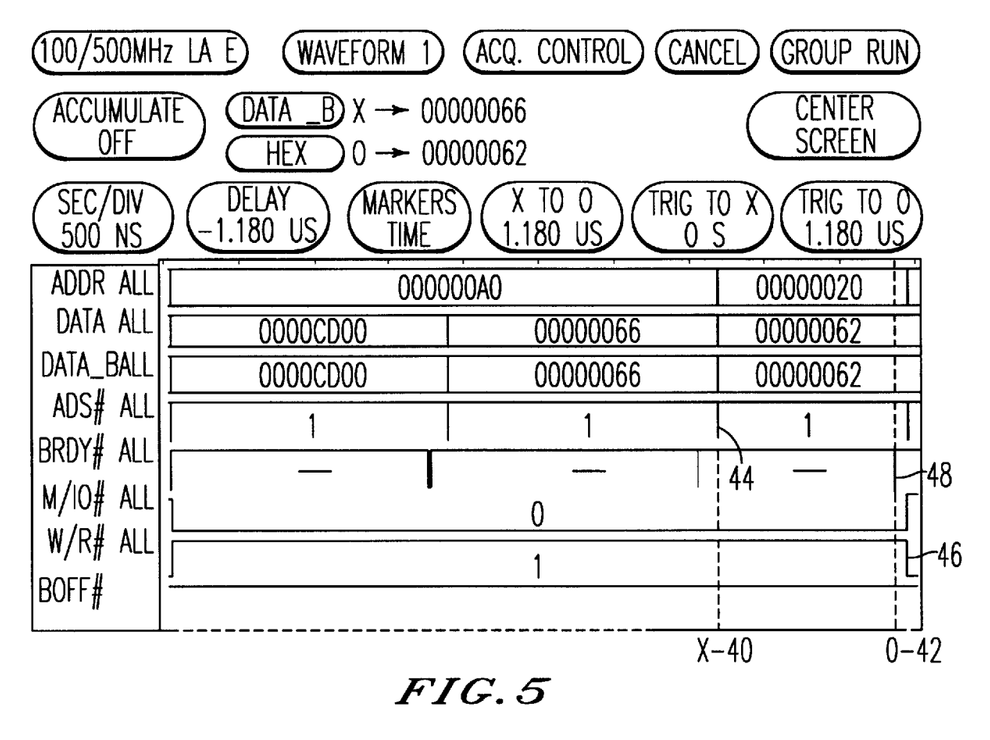
FIG. 5 is a timing diagram of an I/O transaction directed to XT/AT legacy I/O devices.

Experimental results performed by the inventors have shown that access to legacy I/O devices are quite frequent. The inventors experimented on the background art system of FIGS. 7 and 8 to determine the number of I/O transactions directed to the legacy I/O devices while the CPU 2 was running Winstone 96, a popular Windows based system level benchmark program, and a timing diagram of a typical I/O transaction is shown in FIG. 5. During the experiment, 401 I/O transactions were captured while CPU 2 was running Winstone 96. The results of this experiment indicate that 44.6% of the I/O transactions were directed towards the interrupt controller 18, timer/counter 20 and the real time clock 22 of the south bridge 8.

In FIG. 5, between markers X-40 and O-42, a stable I/O address 44 is asserted (ADS# 44 asserted) and the write data is taken by the I/O device (W/R# 46 and BRDY# 48 are asserted). As shown in FIG. 5, approximately 1.5 micro seconds are needed to complete a typical I/O cycle.

The present invention overcomes this lengthy time requirements in the background art of FIGS. 7 and 8 by relocating legacy I/O devices (e.g., interrupt controller 18, timer/counter 20 and real time clock 22) from the south bridge 8 to the north bridge 4, while maintaining compatibility with hardware and software designed to operate with the legacy I/O devices.

FIG. 1 shows such a relocation of an interrupt controller 18, a timer/counter 20 and a real time clock 22 to the north bridge 4' from the background art south bridge 8 of FIG. 8.

Figure 2:
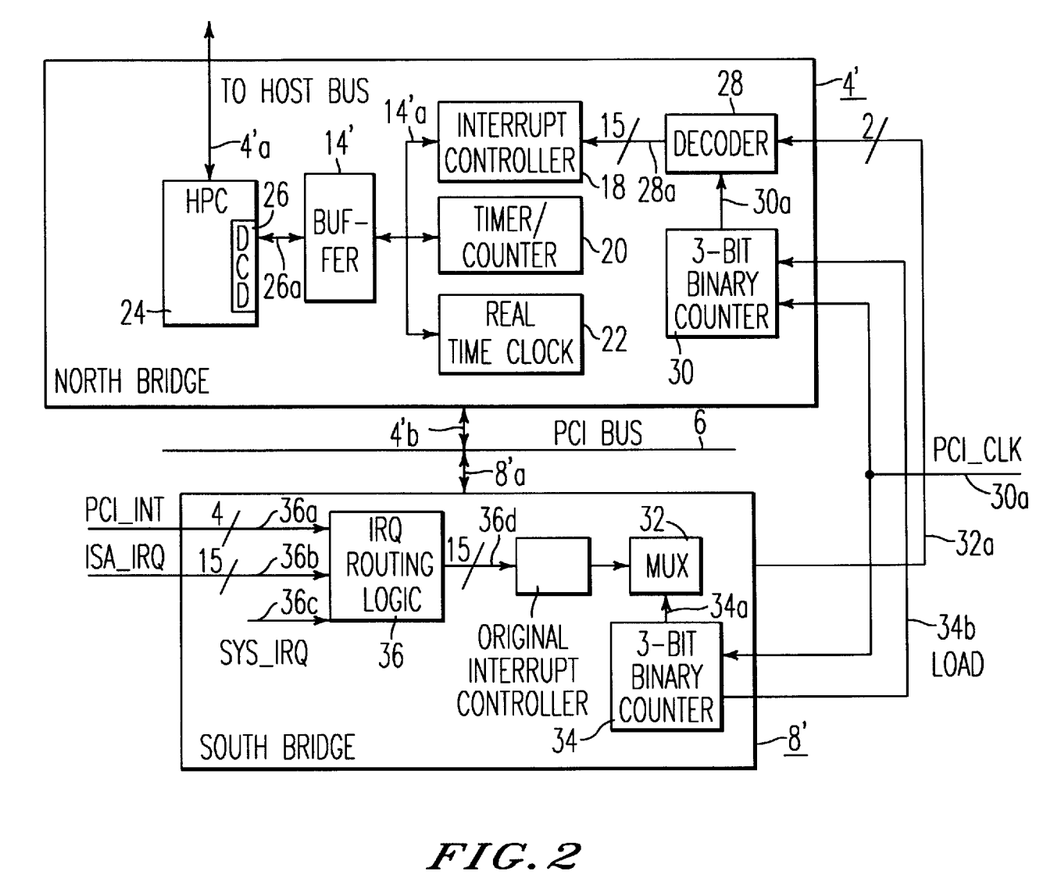
FIG. 2 is a block diagram showing details of relocating an interrupt controller from a south bridge to a north bridge according to the present invention.
Figure 3:
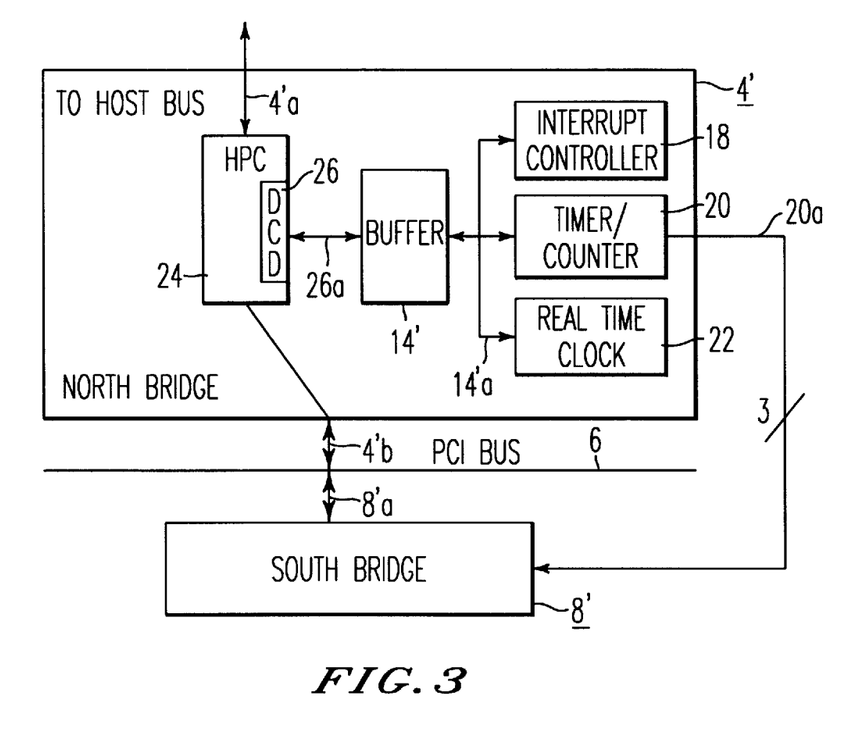
FIG. 3 is a block diagram showing relocating of a timer/counter from a south bridge to a north bridge according to the present invention.
Figure 4:
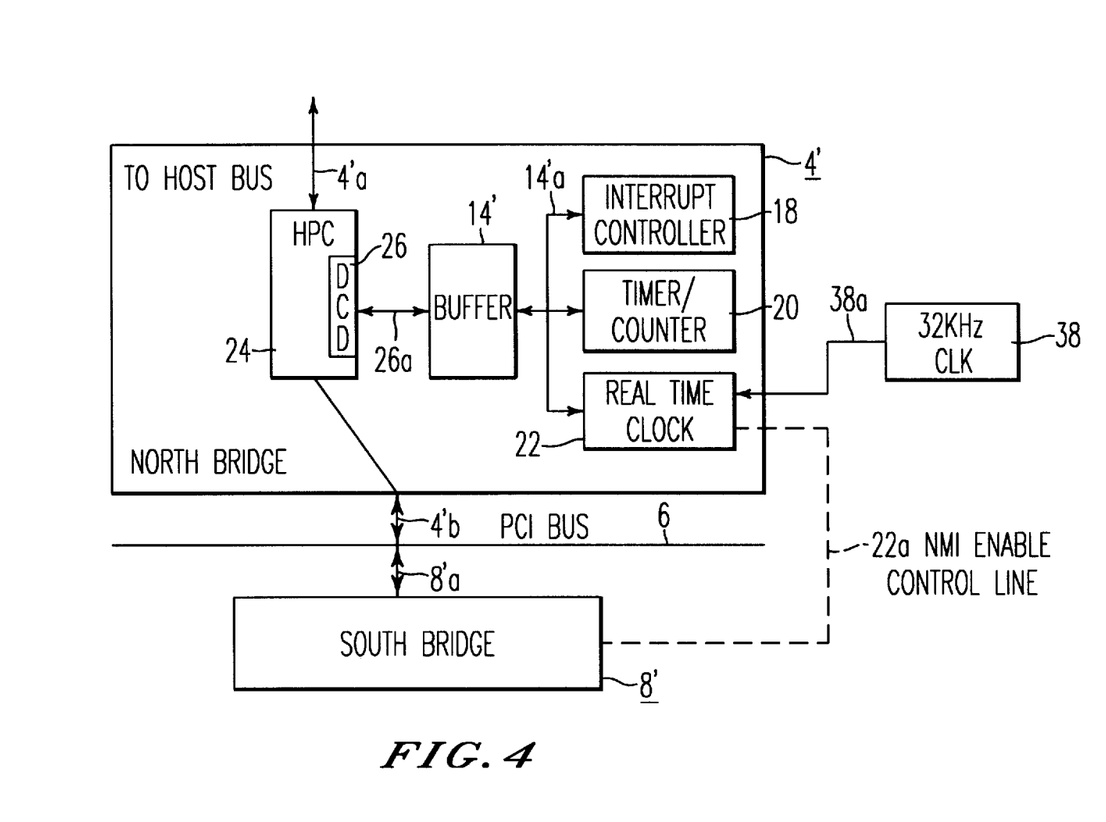
FIG. 4 is a block diagram showing relocating of a real time clock from a south bridge to a north bridge according to the present invention.

FIGS. 2 through 4 show the details of the modifications to the north bridge 4 and the south bridge 8 in the present invention to accomplish the relocation of the interrupt controller 18, the timer/counter 20 and the real time clock 22 to the north bridge 4' of FIG. 1. Specifically, FIG. 2 shows the relocation of the interrupt controller 18, FIG. 3 shows the relocation of the timer/counter 20, and FIG. 4 shows the relocation of the real time clock 22, each to the north bridge 4'. Accordingly, in FIGS. 2 through 4 the north bridge 4 has been labeled as north bridge 4' and the south bridge 8 has been labeled as south bridge 8'.

In a preferred embodiment, all of the modifications to the north bridge 4' and the south bridge 8' shown in each of FIGS. 2 through 4 would be implemented in the device of FIG. 1.

Referring again to FIG. 1, the north bridge 4' of the present invention includes host-PCI controller 24, buffer 14', and relocated interrupt controller 18, timer/counter 20 and real time clock 22. CPU 2 is coupled to host bus 3 via signal lines 2a. The host-PCI controller 24 of the north bridge 4' is coupled to host bus 3 via signal lines 4'a. PCI bus 6 is coupled to the host-PCI controller 24 of the north bridge 4' via signal lines 4'b. Decode logic 26 of host-PCI controller 24 is coupled to the buffer 14' via signal lines 26a. The buffer 14' is coupled to interrupt controller 18, timer/counter 20 and real time clock 22 via bus 14'a. The host-PCI controller 24 receives data and signals from the CPU 2 over the signal lines 2a and 4'a and transmits data and signals to the PCI bus 6 over the signal lines 4'b. The operation of the north bridge 4' according to the present invention will now be described.

When CPU 2 performs an I/O transaction directed towards the interrupt controller 18, the timer/counter 20 or the real time clock 22 of the north bridge 4', the host-PCI controller 24 of the north bridge 4' captures the I/O transaction. Instead of passing the I/O transaction downstream to the PCI bus 6 and subsequently reaching the legacy I/O devices in the south bridge 8', the host-PCI controller 24 decodes the captured I/O transaction via the decode logic 26 and accesses the appropriate I/O device (i.e., the interrupt controller 18, the timer/counter 20 or the real time clock 22). In this way, the access latency is now determined only by the design of the legacy I/O devices (i.e., their access delays) rather than the bus to which they are attached. Commercial macrocells of these legacy I/O devices are readily available, and these macrocells are much faster than their discrete component counterparts, used in typical XT/AT designs such as shown in FIGS. 7 and 8, because they are targeted at higher performance IC technologies.

When the interrupt controller 18, the timer/counter 20 and the real time clock 22 are relocated to the north bridge 4', their interaction with other logic inside the south bridge 8' must not be affected, so that XT/AT ISA bus PC compatibility is maintained. Specifically, this means that the relocation of the interrupt controller 18, the timer/counter 20 and the real time clock 22 to the north bridge 4' should be transparent to the operation of a conventional ISA bus 10. The following discussion explains how the above is accomplished according to the present invention with reference to FIGS. 2–4.

FIG. 2 shows interrupt controller 18 relocated from south bridge 8' to north bridge 4' according to the present invention. In the background art south bridge 8, such as shown in FIG. 7, 15 interrupt request lines are typically provided to access an interrupt controller. In order to make the relocation of the interrupt controller 18 from south bridge 8' to north bridge 4' transparent to the south bridge 8', the 15 interrupt request lines 36d that fed the original interrupt controller must be routed to the relocated interrupt controller 18 in the north bridge 4' as explained below.

In FIG. 2, the interrupt controller 18 is coupled to a decoder 28 via signal lines 28a. A 3-bit binary counter 30 is coupled to the decoder 28 via signal lines 30a. The south bridge 8' includes IRQ routing logic 36, multiplexer 32 and 3-bit binary counter 34. The IRQ routing logic 36 is coupled to the multiplexer 32 via signal lines 36d. The 3-bit binary counter 34 is coupled to the multiplexer 32 via signal lines 34a. The multiplexer 32 of south bridge 8' is coupled to the decoder 28 of north bridge 4' via signal lines 32a. The 3-bit binary counters 30 and 34 receive PCI_CLK signal 30a from a clock generator chip (selectable between 25 and 33 MHz) on a motherboard of the PC. The 3-bit binary counter 30 receives a LOAD signal 34b from counter 34 in south bridge 8'. The IRQ routing logic 36 receives PCI_INT signals 36a from PCI I/O devices. The IRQ routing logic 36 also receives ISA_IRQ signal 36b from legacy I/O devices and SYS_IRQ signal 36c from the south bridge 8'. The multiplexer 32 receives signal 36d from IRQ routing logic 36. The operation of these various components of FIG. 2 will now be described.

The interrupt controller 18 may typically include two interrupt controller devices to provide a total of 16 prioritized interrupt request lines (IRQS), but typically only 15 of the 16 prioritized interrupt request lines may be usable. This is because one of the interrupt request lines is typically used for cascading the two interrupt controller devices, as will be apparent to those skilled in the computer arts. The 15 interrupts are shared among four PCI interrupts (PCI_INT 36a which includes INTA#, INTB#, INTC#, INTD#), the ISA bus interrupt request (ISA_IRQ 36b) and the system interrupt request from the system devices (SYS_IRQ 36c).

As noted above, to make the relocation the interrupt controller 18 transparent to the south bridge 8', the 15 interrupt request lines 36d that fed the original interrupt controller must be routed to the interrupt controller 18 in the north bridge 4'. One possible method is to reroute all 15 interrupt request lines 36d directly to the north bridge 4'. However, this method would require 15-pins in each of the north bridge 4' and the south bridge 8' to accommodate the 15 rerouted interrupt request lines 36d. An alternate method, according to a preferred embodiment of the present invention, is to multiplex these 15 interrupt request lines 36d via multiplexer 32 as two multiplexed lines 32a using scanning logic (e.g., 3-bit binary counters 30 and 34). A LOAD signal 34b from the 3-bit binary counters 34 synchronizes the two 3-bit binary counters 30 and 34 with the PCI_CLK signal 30a which may be generated on the motherboard of the PC as discussed previously. Another possible method is to relocate the IRQ routing logic 36 to the north bridge 4' and multiplex the SYS_IRQ lines 36c from the south bridge 8' to the interrupt controller 18 in the north bridge 4' via an external multiplexer.

In addition to the relocation of the interrupt controller 18 to the north bridge 4', the timer/counter 20 may also be relocated to the north bridge 4' from the south bridge 8' as will now be discussed with reference to FIG. 3. In order to make the relocation the timer/counter 20 transparent to the south bridge 8', outputs 20a (discussed further below) of the timer/counter 20 that originally fed the south bridge 8' must be routed back to the south bridge 8' from the north bridge 4', as shown in FIG. 3.

In FIG. 3, the north bridge 4' includes the timer/counter 20 coupled to the south bridge 8' via signal lines 20a. In order to make the relocation of the timer/counter 20 to the north bridge 4' transparent, the outputs 20a of the timer/counter 20 must be routed from the north bridge 4' to the south bridge 8'. The three outputs 20a that must be routed back to the south bridge 8' are described as follows:

1) The output of counter #0 (e.g., refresh request),

2) The output of counter #1 (e.g., 1.19 MHz clock output), and

3) The output of counter #2 (e.g., speaker output).

With this rerouting of outputs 20a back to the south bridge 8', relocation of timer/counter 20 to the north bridge 4' will be transparent to CPU 2 I/O transactions accessing timer/counter 20 through south bridge 8'.

In addition to the relocation of the timer/counter 20 to the north bridge 4' from the south bridge 8', real time clock 22 may also be relocated to the north bridge 4' as now will be discussed with reference to FIG. 4. In order to make the relocation of the real time clock 22 transparent to CPU 2 I/O transactions accessing real time clock 22 through the south bridge 8', an output 22a of the real time clock 22 that originally fed the south bridge 8' must be routed back to the south bridge 8' from the north bridge 4', and an output 38a of an external clock source 38 (e.g, on the motherboard of the PC) that fed the original real time clock in south bridge 8' must be routed to the north bridge 4' as shown in FIG. 4.

In FIG. 4, the north bridge 4' includes the real time clock 22 which may be coupled to the south bridge 8' via NMI enable control signal lines 22a (shown as a dashed line). The real time clock 22 sends an NMI enable control signal to the south bridge 8' to enable the non-maskable interrupts (NMI) previously discussed.

Two changes are needed to support the relocation of the real time clock 22 to the north bridge 4' according to the present invention. First, the output 38a of clock source 38 (e.g., a 32 KHz clock source typically located on the motherboard of the PC) is needed to drive the real time clock 22 in north bridge 4', as previously discussed. Although in a preferred embodiment the output 38a of the external clock source 38 on the motherboard of the PC is used, it is also possible to use an internal oscillator located within the north bridge 4' as a substitute for the external clock source 38. In addition to the external clock source 38, an NMI enable control signal must also be routed from the north bridge 4' to the south bridge 8'. The function of the NMI enable control signal will now be described.

When the contents of the real time clock 22 (e.g., date, hour or minute) are accessed in a legacy XT/AT ISA bus PC, this access is completed using an access to I/O location 70h. However, in the XT/AT ISA bus PC, bit 7 of this address location is also used to control the enable or disable of the generation of NMIs as a result of some other system event (e.g., a parity error). Therefore the value of the state of bit 7 of I/O location 70h must be passed back to the south bridge 8' as the NMI enable control signal 22a to maintain transparency.

The passing of the value of the state of bit 7 of I/O location 70h can be accomplished in at least two possible methods. A first method, according to the present invention, is to have the real time clock 22, which has been relocated to the north bridge 4', connected at a same signal point that the real time clock 22 would be connected if located in the south bridge 8'. The first method is achieved in the present invention by adding a connection of a NMI enable control signal line 22a (shown as a dashed line in FIG. 4). An advantage of this method is that I/O access to I/O location 70h can be completed with a fastest possible timing since the real time clock 22 is located in the north bridge 4'. The disadvantage is that two new pins are required for routing the NMI enable control signal line 22a, one for the north bridge 4' and one for the south bridge 8'. A second method is to have the host-PCI controller 24 pass the NMI enable control signal (i.e., bit 7 of I/O location 70h) to the south bridge 8' via already existing signal lines 4'b and 8'a. Using this second method, when the CPU 2 accesses the real time clock 22 during an I/O location 70h I/O transaction, the real time clock 22 inside the north bridge 4' responds with the fastest timing. However, the I/O transaction does not terminate there. The value of the state of bit 7 must then pass through the PCI bus 6 to be decoded by the south bridge 8'. The south bridge 8' takes the value of the state of bit 7 of I/O location 70h as the normal NMI enable control signal. The advantage to this method is that no additional pins are needed in the north bridge 4' or the south bridge 8', i.e., a dedicated NMI enable control signal line 22a is not required. However, the disadvantage to this method is that I/O location 70h access is not completed at the fastest possible speed since the value of the state of bit 7 must be passed through the PCI bus 6 to be decoded by the south bridge 8'.

By implementing the structures of the present invention as discussed above with respect to FIGS. 2–4, the interrupt controller 18, the timer/counter 20 and the real time clock 22 can operate within north bridge 4' to provide XT/AT ISA bus PC compatibility at a fastest possible timing. No extra logic is required according to the present invention, except the changes as described above. All other operations remain the same.

The present invention achieves relocation of the interrupt controller 18, the timer/counter 20 and the real time clock 22 to the north bridge 4' to thereby minimize the time required for CPU 2 perform I/O transaction to the legacy I/O devices and still maintain compatibility with ISA bus peripherals and software. However, certain legacy I/O devices may require certain timing restrictions, for example, to accommodate ISA bus software or hardware peripherals that rely on the slower ISA bus timing. For example, a legacy interrupt controller may require a precharge time for completing an I/O transaction. A further operation of a compatibility mode in the present invention may be used to provide such a necessary precharge time, although it is expected that this mode will be rarely required. This compatibility mode will be lower in performance, but allows for compatibility with ISA bus software or hardware peripherals that rely on the slower ISA bus timing. A timing diagram illustrating the compatibility mode will now be described with reference to FIG. 6.

Figure 6:
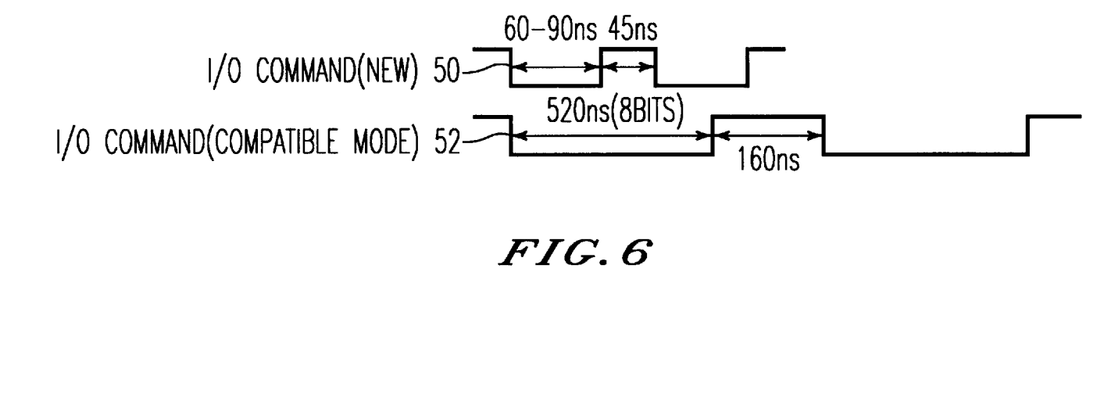
FIG. 6 is a timing diagram showing a compatibility mode according to the present invention.

In FIG. 6, an I/O command 50, according to the present invention, may require 105 to 135 ns to complete, whereas a compatibility mode I/O command 52, according to the present invention, may be completed in 680 ns to maintain compatibility with legacy I/O devices. Such a compatibility mode is accomplished in the present invention by having the host-PCI controller 24 of north bridge 4' insert wait states during I/O transactions directed to legacy I/O devices, thereby extending the timing of the I/O transactions as shown in FIG. 6.

Another design consideration is ISA bus mastering cycles. The ISA master (e.g., a bus mastering SCSI host controller) may attempt to access the legacy I/O devices via an I/O transaction. The south bridge 8' decodes such I/O transactions, and arbitrates for the PCI bus 6. Once the south bridge 8' has control of the PCI bus 6, the south bridge 8' accesses the I/O devices inside the north bridge 4' to complete the ISA bus mastering cycle.

The present invention has the advantage that it improves system performance of an XT/AT ISA bus compatible PC by reducing the CPU access latency to the XT/AT legacy I/O devices. The background art method limits the rate that these legacy I/O devices are accessed by the bus band width of the ISA bus. In the method according to the present invention, access latency is only a function of the I/O device design rather than the bus to which the I/O device is attached. In other words, if a future CPU is running at 100 MHz, a suitably designed I/O device can respond to such CPU I/O cycles without effecting XT/AT ISA bus PC compatibility. Another benefit of the design according to the present invention is that while the CPU is accessing the legacy I/O devices, the PCI or ISA bus masters can utilize these buses since the necessary signals are routed between the north bridge 4' and the south bridge 8' without PCI/ISA bus interaction. This concurrent bus operation translates into higher system performance. This is not possible with the background art method since the background art method requires PCI/ISA bus interaction to complete an I/O transaction.

Although the preferred embodiment of the host bus interface is described in terms of a north bridge and south bridge, the present invention could be adapted for use by placing the legacy I/O devices in a location that takes advantage of the host bus and the speed capabilities of the CPU, as will be apparent to those skilled in the computer art.

Although the preferred embodiment of the host bus interface is described in terms of relocating the interrupt controller 18, timer/counter 20 and real time clock 22 to the north bridge 4', the present invention could be adapted to accommodate the relocation of various other I/O devices to the north bridge 4', as will be apparent to those skilled in the computer art.

Although the preferred embodiment of the host bus interface is described in terms of a PCI Bus, the present invention could be adapted for other bus standards such as NuBus, VESA, EISA, etc., by simply modifying the host-PCI controller 24 and PCI/ISA controller 12, as will be apparent to those skilled in the computer art.

Although the preferred embodiment of the PCI bus interface is described in terms of discrete logic functions, the present invention could be adapted to be packaged onto a single integrated circuit, field programmable gate array, application specific integrated circuit, or custom integrated circuit, as will be apparent to those skilled in the computer art.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A host bus interface device for interfacing a processor coupled to a host bus to I/O devices and a high speed bus, comprising:
    a host controller coupled between the host bus and the high speed bus; I/O devices coupled to the host controller, the I/O devices including an interrupt controller, a timer device, and a clock device;
    the host controller configured to provide an interface between the processor and the I/O devices and between the processor and the high speed bus; and
    a buffer device coupled between the host controller and the I/O devices;
    the host controller including a decoder coupled to the buffer device and configured to decode I/O transactions from the processor to at least one of the I/O devices.

2. A host bus interface device for interfacing a processor coupled to a host bus to at least one I/O device and a high speed bus, comprising:
    a host controller coupled between the host bus and the high speed bus;
    at least one I/O device coupled to the host controller;
    the host controller configured to provide an interface between the processor and the at least one I/O device and between the processor and the high speed bus; and
    a buffer device coupled between the host controller and the at least one I/O device;
    the host controller including a decoder coupled to the buffer device and configured to decode I/O transactions from the processor to the at least one I/O device.

3. A computer system comprising:
    a host bus;
    a high speed bus;
    a low speed bus;
    a processor coupled to the host bus;
    a host bus bridge coupled between the host bus and the high speed bus; and
    a low speed bus bridge coupled between the high speed bus and the low speed bus;
    the host bus bridge comprising,
    a host controller coupled between the host bus and the high speed bus,
    I/O devices coupled to the host controller, the I/O devices including an interrupt controller, a timer device, and a clock device,
    the host controller configured to provide an interface between the processor and the I/O devices and between the processor and the high speed bus, and
    a buffer device coupled between the host controller and the I/O devices,
    the host controller including a decoder coupled to the buffer device and configured to decode I/O transactions from the processor to at least one of the I/O devices.

4. A computer system comprising:
    a host bus;
    a high speed bus;
    a low speed bus;
    a processor coupled to the host bus;
    a host bus bridge coupled between the host bus and the high speed bus; and
    a low speed bus bridge coupled between the high speed bus and the low speed bus;
    the host bus bridge including,
    a host bus and the high speed bus,
    at least one I/O device coupled to the host controller,
    the host configured to provide an interface between the processor and the at least one I/O device and between the processor and the high speed bus, and
    a buffer device coupled between the host controller and the at least one I/O device,
    the host controller including a decoder coupled to the buffer device and configured to decode I/O transactions from the processor to the at least one I/O device.

5. The device according to claim 1, wherein the host controller is configured to provide a compatibility mode for extending a timing of the I/O transactions.

6. The device according to claim 2, wherein the host controller is configured to provide a compatibility mode for extending a timing of the I/O transactions.

7. The system according to claim 3, wherein the host controller is configured to provide a compatibility mode for extending a timing of the I/O transactions.

8. The system according to claim 4, wherein the host controller is configured to provide a compatibility mode for extending a timing of the I/O transactions.

9. The device according to claim 1, further comprising:
    a low speed bus; and
    a low speed bus controller coupled between the high speed bus and the low speed bus.

10. The device according to claim 2, further comprising:
    a low speed bus; and
    a low speed bus controller coupled between the high speed bus and the low speed bus.

11. The system according to claim 3, the low speed bus bridge comprising:
    a high speed bus controller coupled between the high speed bus and the low speed bus; and
    a memory controller coupled to the high speed bus controller;

the high speed bus controller configured to provide an interface between the host bus bridge and the memory controller and between the host bus bridge and the low speed bus.

12. The system according to claim 4, the low speed bus bridge comprising:

a high speed bus controller coupled between the high speed bus and the low speed bus; and a memory controller coupled to the high speed bus controller;

the high speed bus controller configured to provide an interface between the host bus bridge and the memory controller and between the host bus bridge and the low speed bus.

\* \* \* \* \*